(12) United States Patent
Mushikabe et al.

(10) Patent No.: US 11,115,400 B2
(45) Date of Patent: Sep. 7, 2021

(54) DEVICE CONTROL METHOD, CONTROL TERMINAL DEVICE AND DEVICE CONTROL SYSTEM

(71) Applicant: Yamaha Corporation, Hamamatsu (JP)

(72) Inventors: Kazuya Mushikabe, Hamamatsu (JP); Akihiko Suyama, Hamamatsu (JP); Keisuke Tsukada, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 177 days.

(21) Appl. No.: 15/940,211

(22) Filed: Mar. 29, 2018

(65) Prior Publication Data

US 2018/0219856 A1 Aug. 2, 2018

Related U.S. Application Data

(63) Continuation of application No. PCT/JP2016/078717, filed on Sep. 28, 2016.

(30) Foreign Application Priority Data

Sep. 30, 2015 (JP) .............................. JP2015-194504

(51) Int. Cl.
*H04L 29/06* (2006.01)
*H04L 12/46* (2006.01)
(Continued)

(52) U.S. Cl.
CPC ........ *H04L 63/0815* (2013.01); *G06F 21/105* (2013.01); *H04L 12/2832* (2013.01);
(Continued)

(58) Field of Classification Search
CPC .............. H04L 63/0815; H04L 63/107; H04L 12/2832; H04L 2012/2849
See application file for complete search history.

(56) References Cited

U.S. PATENT DOCUMENTS

2004/0081178 A1* 4/2004 Fujimori .............. H04Q 3/0058 370/401
2006/0115085 A1* 6/2006 Iwamura ............... H04L 9/0822 380/259

(Continued)

FOREIGN PATENT DOCUMENTS

JP 7-200479 A 8/1995
JP 2004-310372 A 11/2004
(Continued)

OTHER PUBLICATIONS

Japanese-language Office Action issued in counterpart Japanese Application No. 2015-194504 dated Feb. 5, 2019 with unverified English translation (five pages).

(Continued)

*Primary Examiner* — Joseph P Hirl
*Assistant Examiner* — Chi D Nguy
(74) *Attorney, Agent, or Firm* — Crowell & Moring LLP

(57) ABSTRACT

In a control terminal device for controlling a plurality of devices, when account information is registered in a first device which is one of the plurality of devices, after completion of registration of account information in the first device, a second device in which the account information is not registered is searched, and the account information is registered in the searched second device.

11 Claims, 13 Drawing Sheets

(51) Int. Cl.
| | |
|---|---|
| *G06F 21/10* | (2013.01) |
| *H04N 21/475* | (2011.01) |
| *H04N 21/436* | (2011.01) |
| *H04N 21/239* | (2011.01) |
| *H04N 21/81* | (2011.01) |
| *H04L 12/28* | (2006.01) |
| *G06F 21/45* | (2013.01) |

(52) U.S. Cl.
CPC ........ *H04L 12/4625* (2013.01); *H04L 63/107* (2013.01); *H04N 21/2396* (2013.01); *H04N 21/43615* (2013.01); *H04N 21/4751* (2013.01); *H04N 21/4753* (2013.01); *H04N 21/8106* (2013.01); *G06F 21/45* (2013.01); *H04L 2012/2849* (2013.01)

(56) References Cited

U.S. PATENT DOCUMENTS

| | | | |
|---|---|---|---|
| 2008/0098088 A1 | 4/2008 | Tamano et al. | |
| 2013/0013757 A1* | 1/2013 | Millington | G06F 3/0482 709/222 |
| 2014/0222900 A1* | 8/2014 | Todd | H04L 67/2842 709/203 |
| 2015/0082414 A1* | 3/2015 | Dawes | H04L 12/2834 726/12 |
| 2015/0113564 A1 | 4/2015 | Mushikabe | |
| 2015/0187209 A1* | 7/2015 | Brandt | H04L 65/80 340/12.22 |
| 2016/0134488 A1* | 5/2016 | Straub | H04L 63/0884 726/4 |
| 2016/0165440 A1* | 6/2016 | Bae | H04W 12/04 455/411 |
| 2017/0118636 A1* | 4/2017 | Zoorob | H04W 12/0023 |

FOREIGN PATENT DOCUMENTS

| | | |
|---|---|---|
| JP | 2006-301888 A | 11/2006 |
| JP | 2013-251594 A | 12/2013 |
| JP | 2015-50752 A | 3/2015 |
| WO | WO 2006/075616 A1 | 7/2006 |

OTHER PUBLICATIONS

International Search Report (PCT/ISA/210) issued in PCT Application No. PCT/JP2016/078717 dated Dec. 13, 2016 with English-language translation (five (5) pages).

Japanese-language Written Opinion (PCT/ISA/237) issued in PCT Application No. PCT/JP2016/078717 dated Dec. 13, 2016 (five (5) pages).

Japanese-language Office Action issued in counterpart Japanese Application No. 2015-194504 dated Nov. 13, 2018 with English translation (five (5) pages).

International Preliminary Report on Patentability (PCT/IB/373) issued in PCT Application No. PCT/JP2016/078717 dated Apr. 3, 2018, including English translation of document C2 (Japanese-language Written Opinion (PCT/ISA/237)) previously filed on Mar. 29, 2018 (eight pages).

* cited by examiner

FIG. 4

SYSTEM MANAGEMENT TABLE (DEVICE LIST · AP LIST)

| DEVICE ID | MAC ADDRESS | IP Address | NUMBER OF HOPS | AP ACTIVATION | NUMBER OF CHILDS |
|---|---|---|---|---|---|
| 00 (4-1) | xx-xx-xx-xx-xx-xx yy-yy-yy-yy-yy-yy | 192.168.0.1 192.168.1.1 | 0 (ROOT) | ACTIVATED | 2 |
| 01 (4-2) | xx-xx-xx-xx-xx-xx yy-yy-yy-yy-yy-yy | 192.168.0.2 192.168.1.2 | 1 (NODE) | ACTIVATED | 1 |
| 02 (4-3) | xx-xx-xx-xx-xx-xx yy-yy-yy-yy-yy-yy | 192.168.0.3 192.168.1.3 | 1 (NODE) | NON-ACTIVATED | 1 |
| 03 (4-4) | xx-xx-xx-xx-xx-xx yy-yy-yy-yy-yy-yy | 192.168.0.4 192.168.1.4 | 2 (LEAF) | NON-ACTIVATED | 0 |
| 05 (4-6) | xx-xx-xx-xx-xx-xx yy-yy-yy-yy-yy-yy | 192.168.0.6 192.168.1.6 | 99 (BRANCH) | NON-ACTIVATED | 0 |

| INFORMATION OF EXTERNAL ACCESS POINT | SSID | pass pharase | Security type | BSSID |
|---|---|---|---|---|

FIG. 5

AUDIO CONTROL TABLE

| DEVICE ID | IP Address | DEVICE TYPE | INSTALLATION PLACE | SERVICE |
|---|---|---|---|---|
| 00 | 192.168.0.1 | AV RECEIVER | Living room | DVD, Radio, netA, netB, netC |
| 01 | 192.168.0.2 | PLAYER | Dining room | DVD, netA, netB |
| 02 | 192.168.0.3 | PLAYER | Bed room | Radio, netA, Bluetooth |
| 03 | 192.168.0.4 | SPEAKER | Kitchen | Radio, Bluetooth |
| 05 | 192.168.0.6 | SPEAKER | RoomB | Radio, Bluetooth |

FIG. 6

SERVICE ACCOUNT TABLE

| SERVICE | URL | ACCOUNT NAME | PASSWORD |
|---|---|---|---|
| MUSIC DISTRIBUTION SERVICE net A | htts://www.a·· | | |
| MUSIC DISTRIBUTION SERVICE net B | htts://www.b·· | user1 | ———— |
| MUSIC DISTRIBUTION SERVICE net C | htts://www.c·· | user1 | ———— |

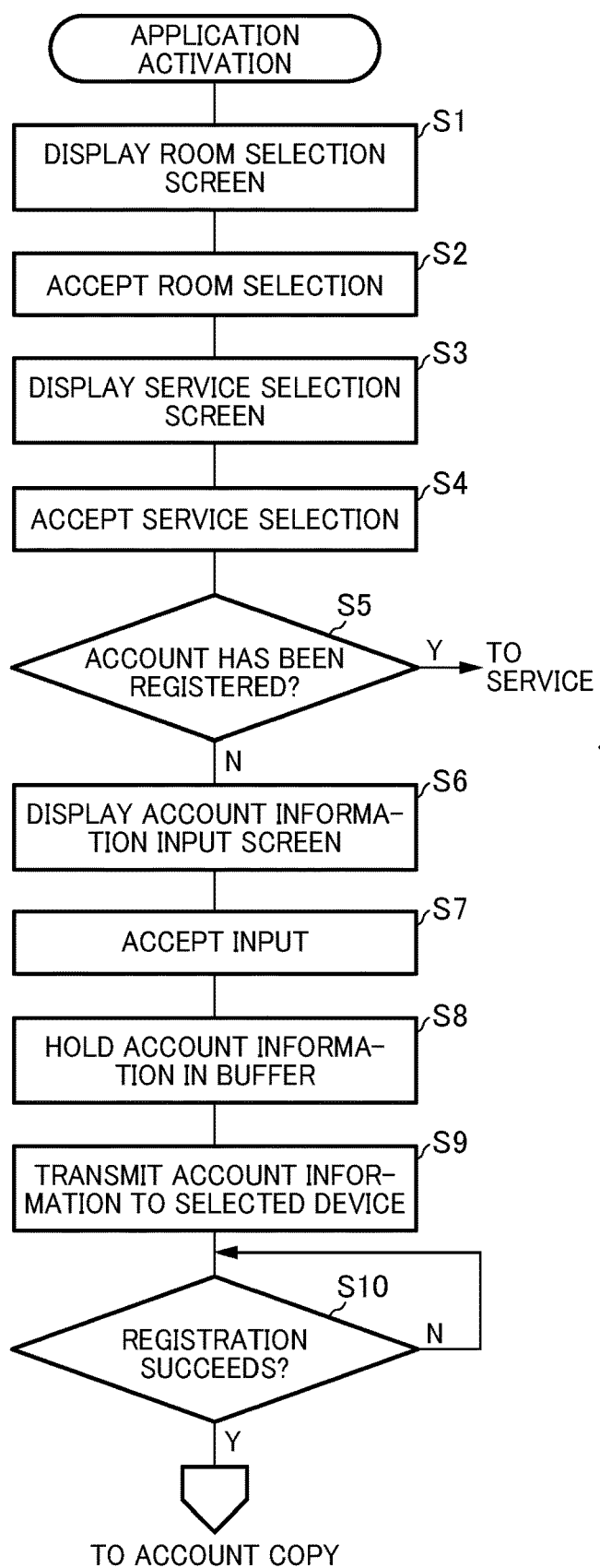
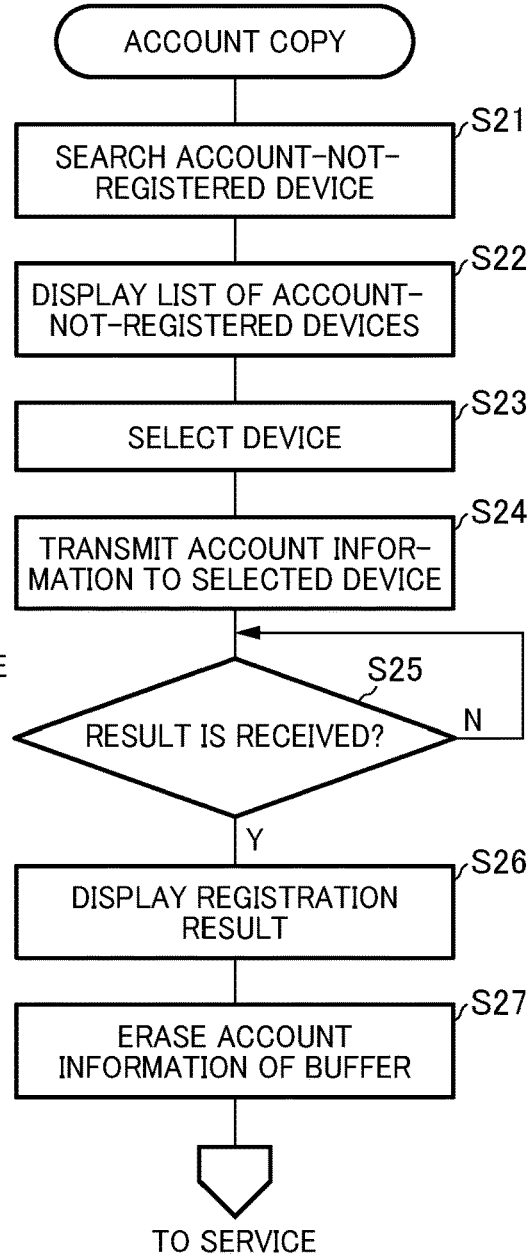

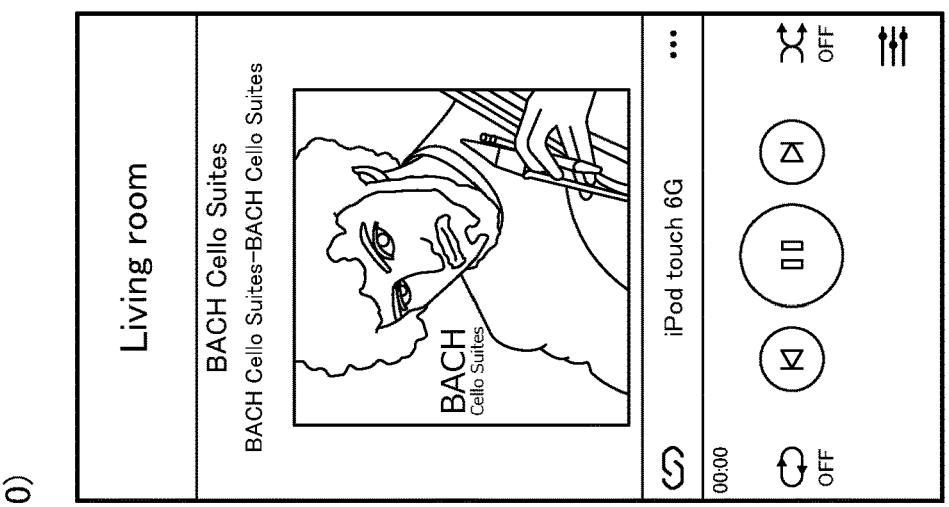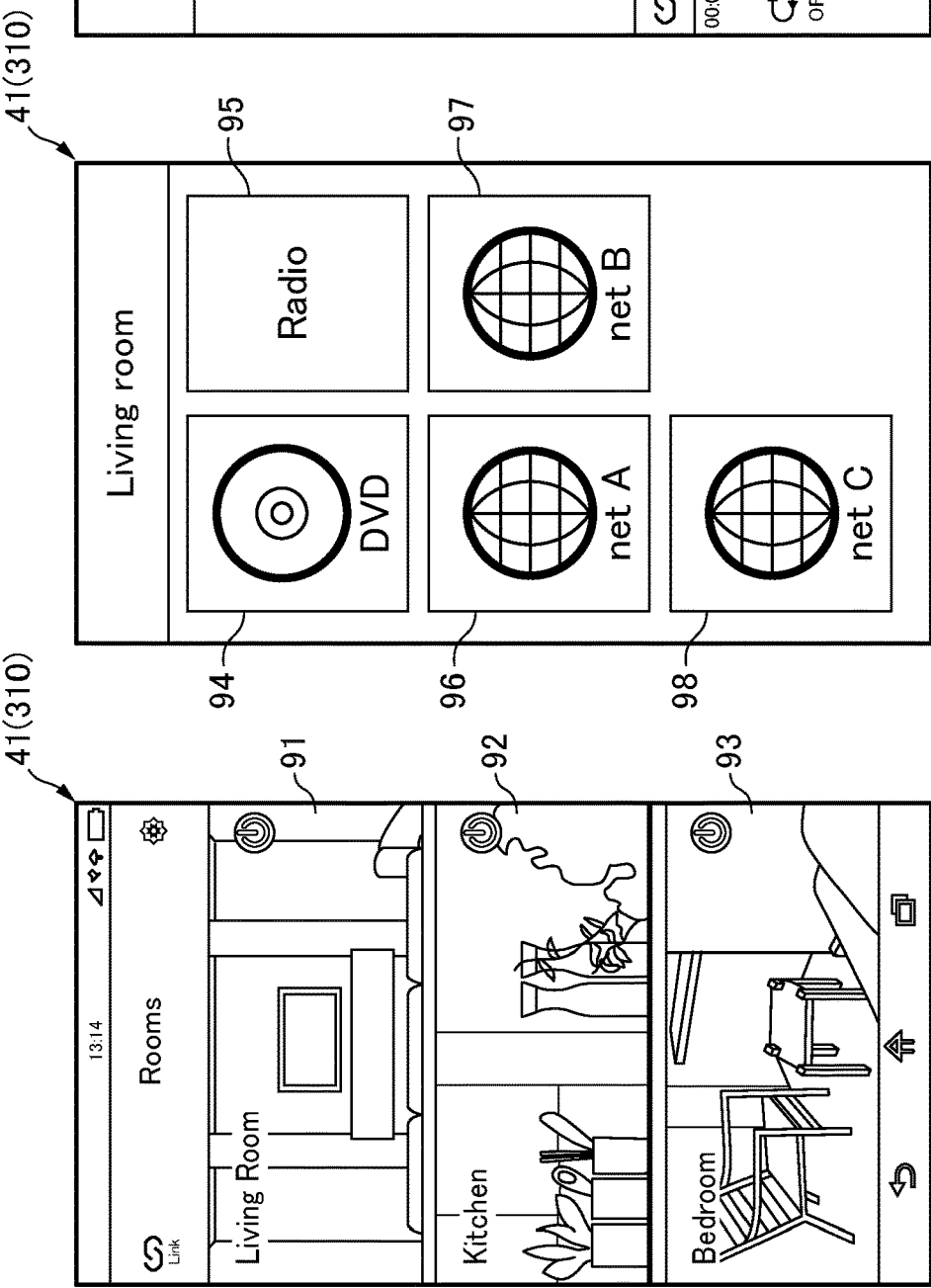
FIG. 8A  FIG. 8B  FIG. 8C

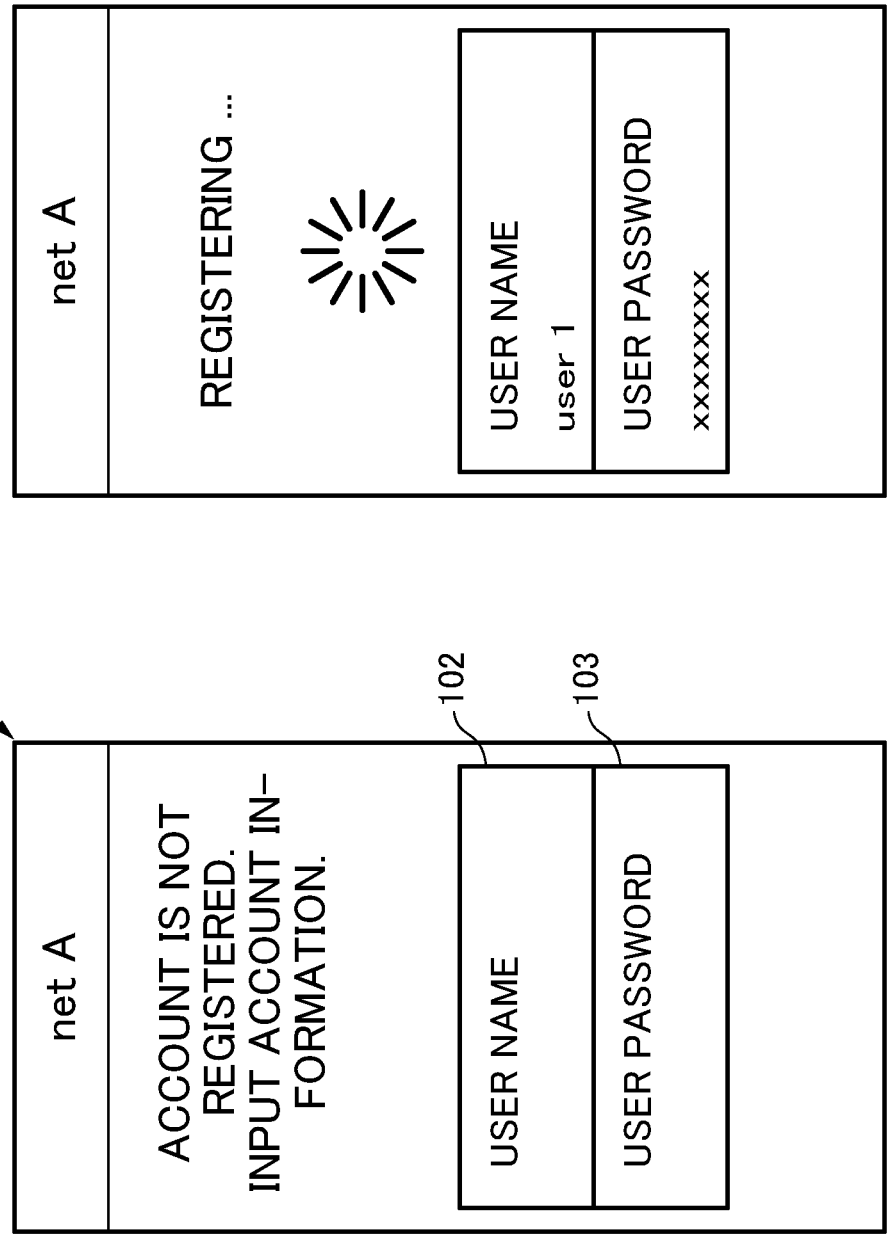

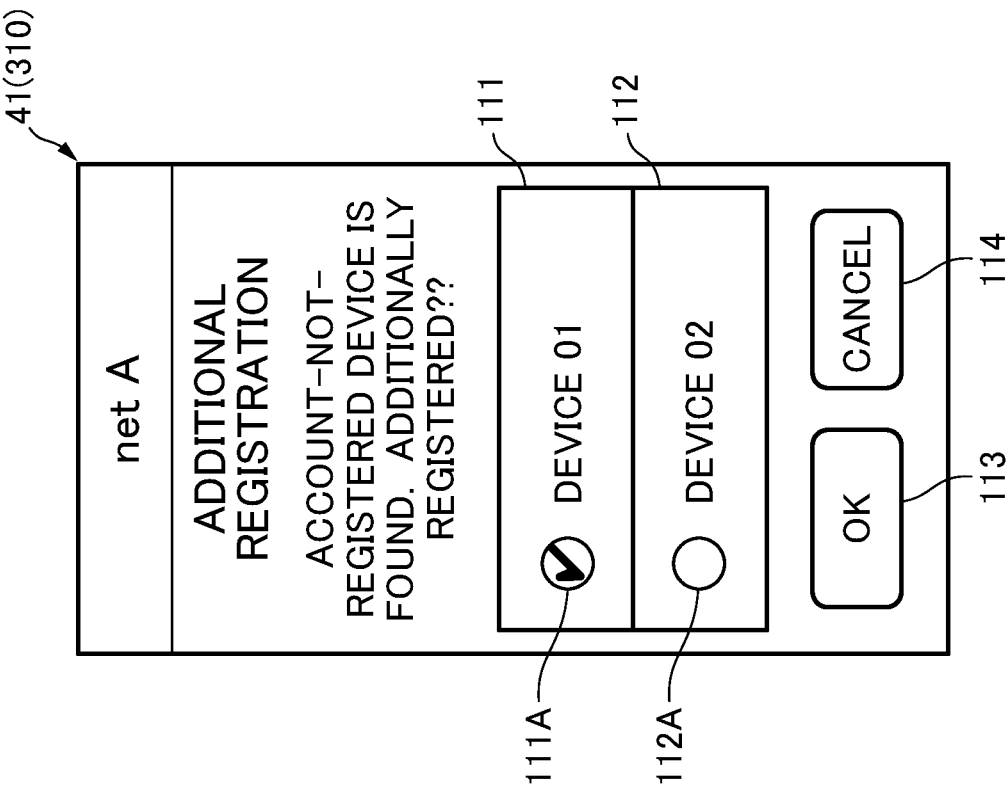
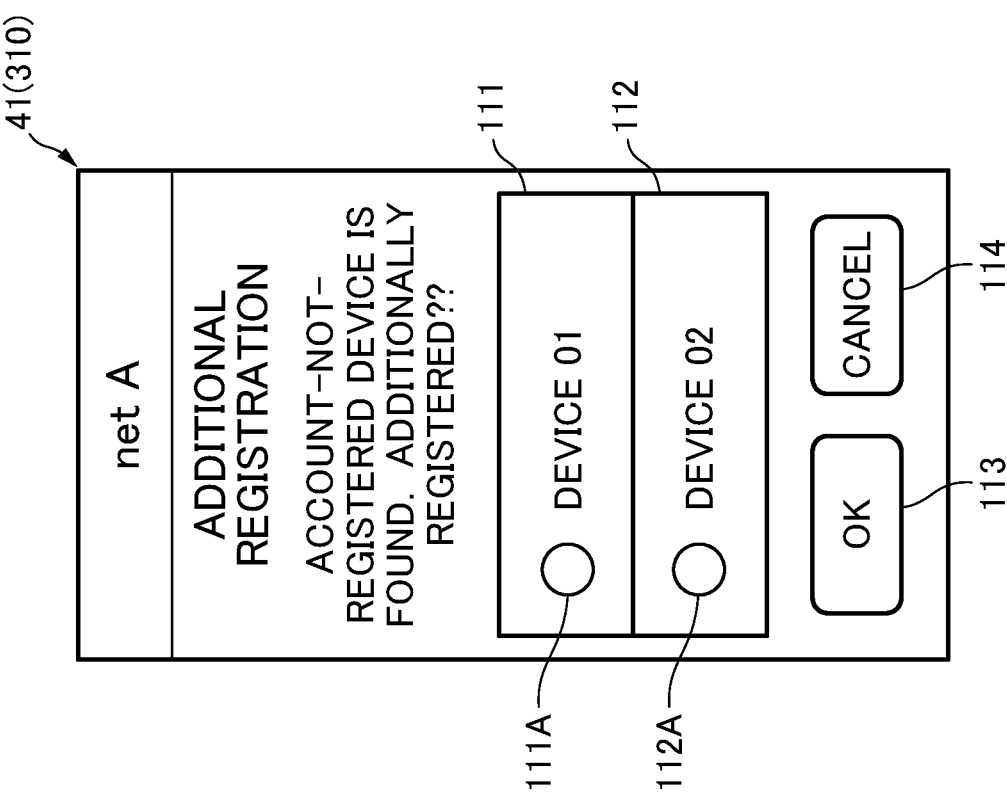

DEVICE CONTROL METHOD, CONTROL TERMINAL DEVICE AND DEVICE CONTROL SYSTEM

CROSS REFERENCE TO RELATED APPLICATIONS

This application is a continuation of PCT application No. PCT/JP2016/078717, which was filed on Sep. 28, 2016 based on Japanese Patent Application (No. 2015-194504) filed on Sep. 30, 2015, the contents of which are incorporated herein by reference.

BACKGROUND OF THE INVENTION

1. Field of the Invention

The present invention relates to a device control method, a control terminal device and a device control system. For example, the control terminal device controls a plurality of devices, and registers account information for using an external service, in the devices.

2. Description of the Related Art

Among recent audio systems, there is a system in which a plurality of audio devices (reproduction devices) that are placed in rooms (areas) such as a living room and bed rooms are connected to a network (particularly, a wireless network), and operations of the audio devices such as reproduction of contents are controlled by a mobile terminal device (for example, see JP-A-2013-251594).

Media such as a DVD, and contents of a music distribution service which is provided via a network such as the Internet are included in contents which are to be reproduced by such a system.

In the case where an audio device streams contents from a distribution server for a music distribution service, account information of the music distribution service must be registered in the audio device. Usually, such account registration is performed by the user while activating an application program of a control terminal such as a smart phone. However, an audio system includes a plurality of audio devices, and therefore it is cumbersome to register account information in each of the audio devices.

SUMMARY OF THE INVENTION

Therefore, it is an object of the invention to, in a control terminal which controls a plurality of devices, facilitate registration of account information for the plurality of devices.

According to one mode of the invention, a device control method for controlling a plurality of devices is provided in which an account information is registered in a first device which is one of the plurality of devices, after registration of the account information in the first device, at least one second device is searched, the second device being at least one device of the plurality of devices, and being a device in which the account information is not registered, and the account information is registered in the at least one searched second device.

BRIEF DESCRIPTION OF THE DRAWINGS

FIG. 4 is a view showing an example of a system management table which is disposed in a host device and the controller.

FIG. 5 is a view showing an example of an audio control table which is disposed in the controller.

FIG. 6 is a view showing an example of a service account table which is disposed in the audio device.

FIGS. 7A and 7B are flowcharts showing the operation of a controlling section (controller) of the mobile telephone.

FIGS. 8A, 8B, 8C, 8D and 8E are views showing examples of a screen display of the controller.

FIGS. 9A, 9B, 9C and 9D are views showing examples of the screen display of the controller.

DETAILED DESCRIPTION OF THE EXEMPLARY EMBODIMENTS

Figure 1:
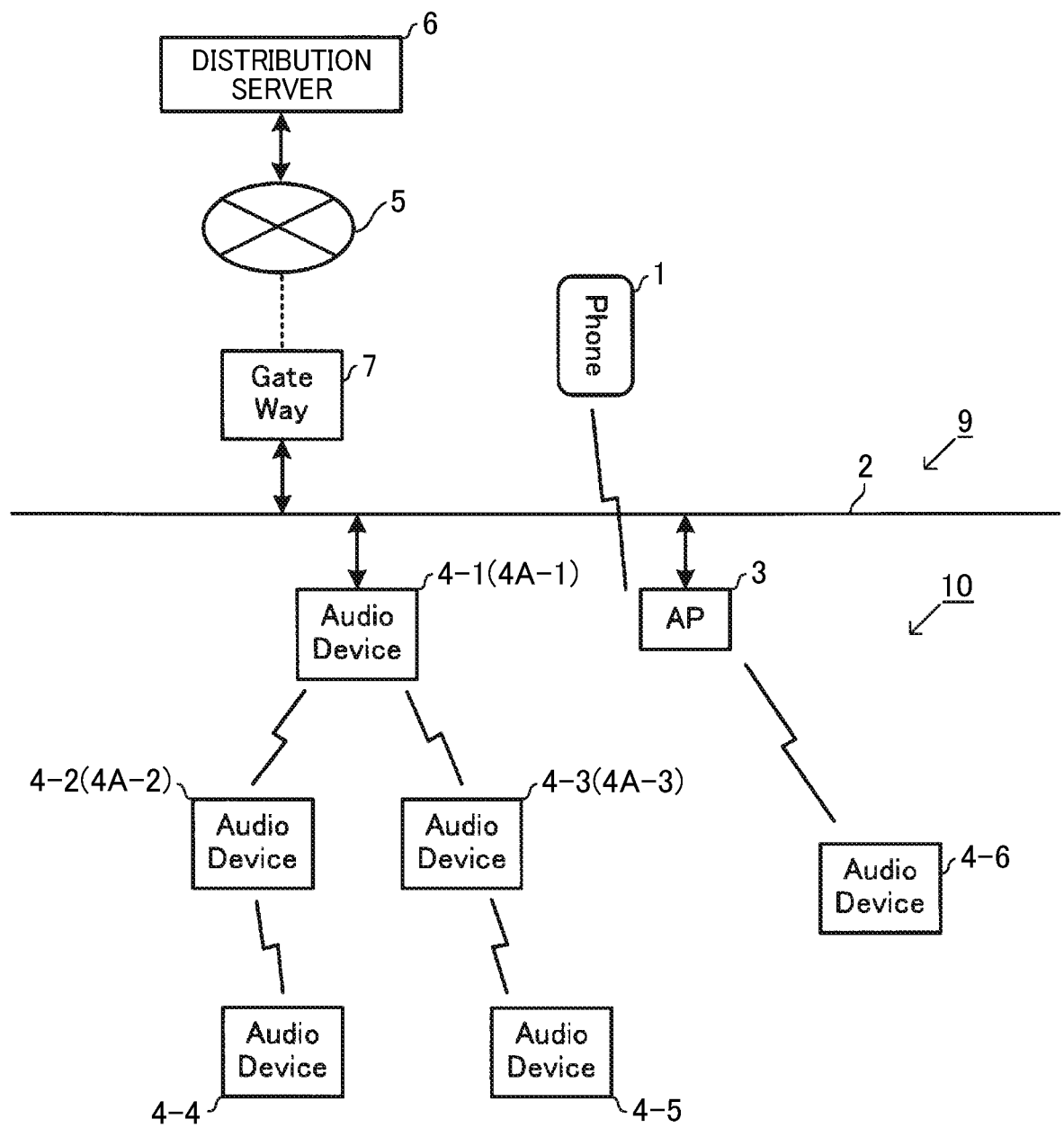
FIG. 1 is a diagram of an audio system to which the invention is applied.

FIG. 1 is a diagram of an audio system to which the invention is applied. The audio system 10 has a plurality of audio devices 4 (4-1 to 4-6) which are connected to one another via a network 9 including a wired LAN 2 and an access point (external access point) 3, and a multifunctional mobile telephone (mobile terminal device) 1 which functions as a controller 1. The audio devices 4 mutually transmit and receive audio signals via the network 9. The controller 1 transmits a command message to the audio devices 4 via the network 9.

Each of the audio devices 4 constituting the audio system 10 has a wired LAN function and two wireless LAN functions. The audio device 4 can activate an access point by using one of the two wireless LAN functions. The access point which is activated by the audio device 4 is called an internal access point 4A. A low-level audio device 4 is connected to the internal access point 4A. The internal access point 4A usually operates in a stealth mode, and its existence cannot be known by other devices. The other wireless LAN function functions as a child unit of a wireless LAN, and is connected to the internal access point 4A of a high-level audio device 4, or the external access point 3.

The access point (external access point) 3 is connected to the wired LAN 2. The audio device 4-1 is connected to the wired LAN 2 via a cable. The audio devices 4-2, 4-3 are connected to the internal access point 4A-1 of the high-level audio device 4-1 by the wireless LAN. The audio device 4-4 is connected to the internal access point 4A-2 of the high-level audio device 4-2 by the wireless LAN. Furthermore, the audio device 4-5 is connected to the internal access point 4A-3 of the high-level audio device 4-3 by the wireless LAN. The audio device 4-6 is connected to the external access point 3.

In the embodiment, the network 9 includes the wired LAN 2, and the wireless LAN including the external access point 3 and the internal access points 4A. For example, Ethernet® (IEEE 802.3) may be used as the wired LAN 2, and Wi-Fi (IEEE 802.11g) may be used as the wireless LAN. A distribution server 6 for a music distribution service is connected to the network 9 from the wired LAN 2 via a gateway 7 and the Internet 5. The distribution server 6 distributes music data to the audio devices 4. Although only one distribution server 6 is illustrated in FIG. 1, a plurality of distribution servers 6 may exist for a plurality of music distribution services. Music data are distributed by the distribution server 6 in a file format such as MP3, WAV, SoundVQ®, WMA®, or AAC.

Depending on the mode of connection to the wired LAN 2, the audio devices 4 are called a root device, a node device, a leaf device, or a branch device.

A root device is a highest-level device which is connected directly (via a cable) to the wired LAN 2, and, in FIG. 1, the audio device 4-1 is a root device. The root device is an audio device which is first registered in construction of the audio system 10, and functions as the base point of the audio system 10. The root device activates the internal access point 4A which causes a low-level device to be connected to the network and joined to the audio system 10. Music information which is reproduced by all audio devices 4 (node and leaf devices) connected to a level(s) which is hierarchically lower than the root device is transmitted via the root device.

A node device is a mid-level device which is connected to a root device (the internal access point 4A of the root device) by the wireless LAN, and, in FIG. 1, the audio devices 4-2, 4-3 are node devices. Each of the node devices activates the internal access point 4A which causes a low-level audio device 4 to be connected to the network and joined to the audio system 10. Music information which is reproduced by the audio device 4 (leaf device) connected to a level that is hierarchically lower than the node device is transmitted via the node device.

A leaf device is a low-level device which is connected to a node device (the internal access point 4A of the node device) by the wireless LAN, and, in FIG. 1, the audio devices 4-4, 4-5 are leaf devices. Although a leaf device does not activate the internal access point 4A, a leaf device may activate the internal access point.

A branch device is the audio device 4 that is connected by the wireless LAN to the external access point 3 separately from the tree in which the root device is at the top, and that communicates with another audio device 4 in the audio system 10 via the wired LAN 2, and, in FIG. 1, the audio device 4-6 is a branch device. Although a branch device does not activate the internal access point 4A, a branch device may activate the internal access point.

In the audio system, for the sake of transmission of a high-quality audio signal, up to two node devices are allowed to be connected to a root device. Furthermore, up to two leaf devices are allowed to be connected to each node device. The maximum number of the hierarchy levels of the connection using the internal access points 4A are three levels of a root device, a node device, and a leaf device. In a tree of a wireless LAN in which a root device is at the top, therefore, seven audio devices including the root device can be connected at the maximum. In the tree shown in FIG. 1, five audio devices 4 (4-1 to 4-5) are connected. The number of branch devices is not limited. As control objects of the controller 1, however, the number of audio devices 4 is limited to up to ten in the whole audio system 10. In the invention, the maximum numbers such as the number of hierarchy levels of a tree, and that of low-level devices which can be connected to each of audio devices 4 are not limited to those in the embodiment.

When an audio system control program 45 (see FIG. 2) is activated, the mobile telephone 1 functions as an audio system controller (hereinafter, controller) 1. The mobile telephone 1 (controller 1) communicates with the audio devices 4 belonging to the audio system 10, via the network 9. Through the communication, the controller 1 generally controls audio sources to be reproduced by the audio devices 4-1 to 4-6 (for example, the audio device 4 to be used in reproduction, a music piece to be reproduced, a music piece to be distributed, and the audio device 4 to which the music piece is to be distributed) of the audio system 10, the volume of the reproduction, and the like. Each of the audio devices 4 communicates with the other audio devices 4 to mutually transmit and receive audio signals via the network 9.

Figure 2:
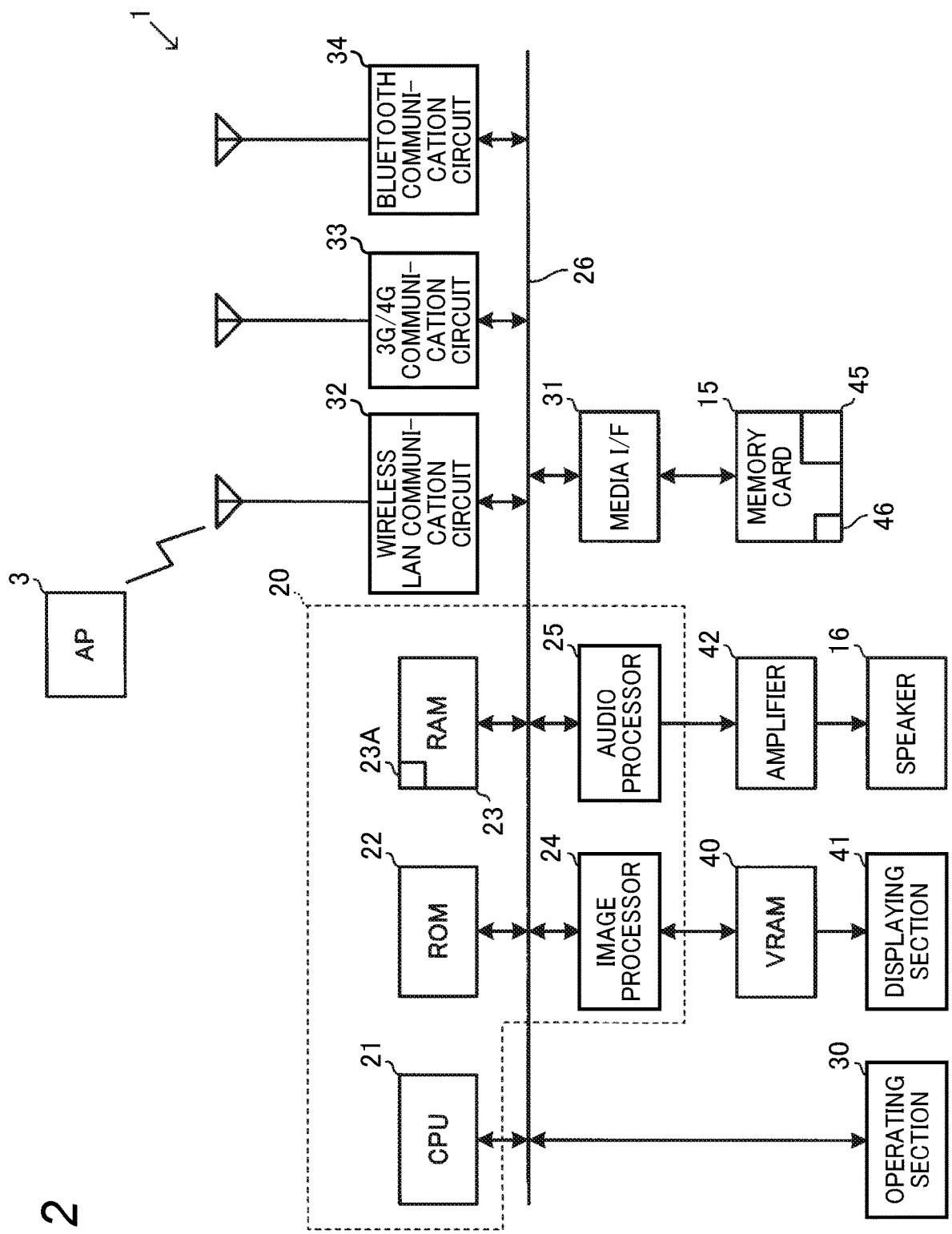
FIG. 2 is a block diagram of a mobile telephone to which the invention is applied, and which functions as a controller.

Referring to the block diagram of FIG. 2, next, the configuration of the mobile telephone 1 will be described. The mobile telephone 1 is a multifunctional telephone which is so-called a smart phone. The mobile telephone 1 has a function of 3G/4G communication which is used in a mobile communication network, that of a wireless LAN (Wi-Fi) communication, and that of Bluetooth® communication. When an audio system control program 45 which is an application program is activated, the mobile telephone 1 functions as the controller 1, communicates with the audio devices 4 of the audio system 10 via the network 9, and transmits a command message according to an operation of the user, to the audio devices 4 to control the audio system.

The mobile telephone 1 has a controlling section 20, an operating section 30, a media interface 31, a Wi-Fi communication circuit 32, a 3G/4G communication circuit 33, and a Bluetooth communicating circuit 34 on a bus 26. The controlling section 20 includes a CPU 21, a ROM (flash memory) 22, a RAM 23, an image processor 24, and an audio processor 25. A video RAM (VRAM) 40 is connected to the image processor 24, and a displaying section 41 is connected to the VRAM 40. The displaying section 41 includes a liquid crystal display. A standby screen, a telephone number, and the like are displayed on the display. In the case where the mobile telephone functions as the controller 1, a screen for controlling the audio devices 4 is displayed. An amplifier 42 including a D/A converter is connected to the audio processor 25, and a speaker 16 is connected to the amplifier 42.

The image processor 24 includes a GPU (Graphics Processing Unit) which produces various videos such as a standby screen and a telephone number. When the audio system control program 45 is activated, the image processor 24 produces an image of an audio controller in accordance with instructions from the CPU 21, and expands the image in the VRAM 40. The image expanded in the VRAM 40 is displayed on the displaying section 41.

The audio processor 25 has a DSP (Digital Signal Processor) which encodes/decodes call sound. The audio processor 25 outputs the decoded/produced sound to the amplifier 42. The amplifier 42 amplifies the audio signal, and then outputs the amplified signal to the speaker 16.

The wireless communication circuit 32 wirelessly communicates with a router 2 according to a standard such as IEEE 802.11g, and communicates with the audio devices 4 via the access point 3. The 3G/4G communication circuit 33 performs audio communication and data communication via the mobile telephone communication network. The Bluetooth communicating circuit 34 communicates with another Bluetooth-enabled device to perform transmission and reception of, for example, an audio signal, and the like.

The operating section 30 includes a touch panel 310 (see FIG. 8 and the like) which is formed on the displaying section 41, and detects a tap operation and a flick operation on the touch panel 310. When the audio system control program 70 is activated, a plurality of operation elements such as a setup button and a scan button are displayed on the displaying section 41. The operating section 30 detects a touch operation of the user and its coordinates on the touch panel 310, and determines the operation element on which the operation is performed.

A memory card 15 is connected to the media interface 31. For example, the memory card 15 is a micro SD card. The audio system control program 45 is stored in the memory card 15 or the ROM 22. In the embodiment, it is assumed that, as shown FIG. 2, the audio system control program 45 is stored in the memory card 15. The audio system control program 45 may be downloaded through data communication of 3G/4G or wireless LAN, or previously stored in the ROM 22 or the memory card 15. A storage area 46 in which the configuration of the audio system is stored is set in the memory card 15.

A basic program for executing calls of the mobile telephone 1 and application programs is stored in the ROM 22. The ROM 22 is a flash memory, and, in addition to the basic program, can further store downloaded application programs and the like. A work area which is used when the CPU 20 executes the audio system control program 45 is set in the RAM 23.

Figure 3:
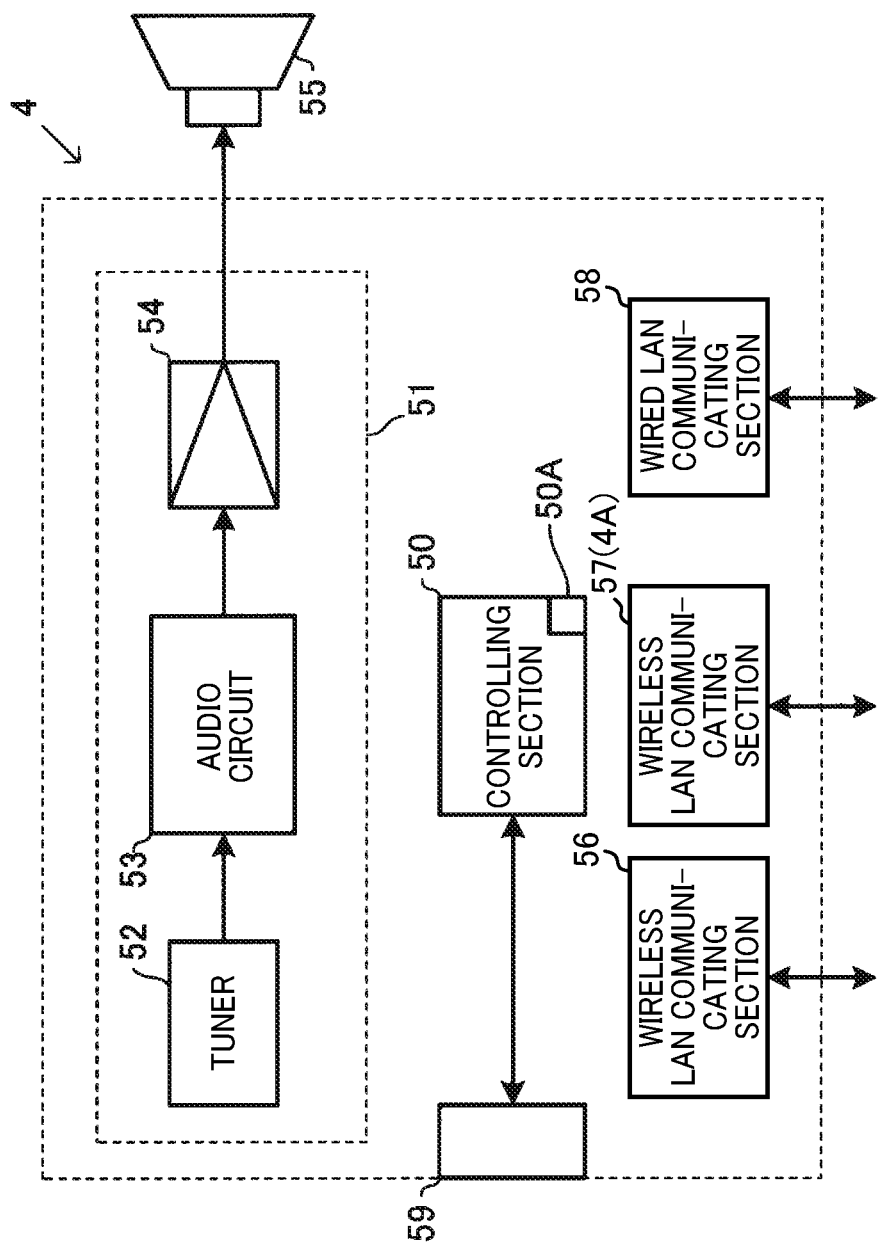
FIG. 3 is a block diagram of an audio device to which the invention is applied.

Referring to FIG. 3, next, the configuration of the audio devices 4 will be described. Each of the audio devices 4 has a controlling section 50, an audio processing section 51, and an operating section 59, and further has two wireless LAN communicating sections (RF modules) 56, 57 and a wired LAN communicating section 58. The operating section 59 has a plurality of operation elements such as a volume operation element (not shown). The controlling section 50 includes a CPU and a memory, and stores an audio system program. The controlling section 50 controls the operations of the audio processing section 51, the wireless LAN communicating sections 56, 57, and the wired LAN communicating section 58 by using the audio system program. Therefore, the audio device 4 functions as a reproduction device which accesses an audio source to reproduce contents. The controlling section 50 accesses the distribution server 6 for a music distribution service via the wireless LAN communicating section 56 or the wired LAN communicating section 58 and the network 9, downloads a music piece which is designated by the user (the controller 1), and reproduces it.

The wireless LAN communicating section 56 wirelessly communicates with the external access point 3 or the internal access point 4A of the high-level audio device 4 in accordance with a wireless LAN standard such as IEEE 802.11g. The other wireless LAN communicating section 57 is activated as an access point (the internal access point 4A), and relays other audio devices (for example, the audio devices 4-2, 4-3 and the like) to the wired LAN 2. Also when the audio device 4 is initially activated, moreover, the wireless LAN communicating section 57 is activated as a provisional access point for the initial connection, and communicates with the controller 1 (mobile telephone 1). The operation in the initial connection will be described later. The two wireless LAN communicating section 56, 57 may be realized by time-divisionally operating one hardware. The wired LAN communicating section 58 has a cable connector, and performs communication via the wired LAN 2 and the access point 3 according to a communication standard such as IEEE 802.3. The controller (mobile telephone) 1 is connected to the access point 3, and the controlling section 50 communicates with the controller 1 through the network 9, transmits the operation status, and receives a command message.

The audio processing section 51 has a tuner 52, an audio circuit 53, and a power amplifier 54. The tuner 52 receives an audio signal from an FM broadcast or the Internet, and inputs the signal to the audio circuit 53. The audio circuit 53 performs processes such as equalizing and volume adjustment on the input audio signal, and then outputs the processed audio signal to the power amplifier 54. The power amplifier 54 amplifies the input audio signal, and outputs the amplified audio signal to a speaker 55 which is externally connected. The speaker 55 emits the input audio signal as sound.

The audio devices 4-1 to 4-6 may be devices which have different functions. In the devices, however, the basic configurations of the communication function and the audio signal processing function are as shown FIG. 3.

FIGS. 4 and 5 are views showing examples of tables for managing the audio system 10, respectively. FIG. 4 shows a system management table for managing the connection forms of the audio devices 4 in the network 9. FIG. 5 shows an audio control table for managing the operations of the audio devices 4 in the audio system 10. The system management table is used mainly by the root device 4-1 for managing the network connection. The audio control table is used mainly by the controller 1 for controlling reproduction of an audio source.

The system management table stores the connection forms of the audio devices 4 (component devices) constituting the audio system 10, is produced by the controller 1 in construction of the audio system 10, and shared by the controller and the root device 4-1. The audio control table stores the functions of the audio devices 4, and is produced by the controller 1 in construction of the audio system 10.

In the system management table, while associating with the device IDs of the devices, each component device stores information such as: the MAC addresses of the high-level side (the side of the child unit)/the low-level side (the side of the internal access point) (i.e., the MAC addresses of the wireless LAN communicating sections 56/57); the IP addresses of the high-level side/the low-level side (i.e., the IP addresses of the wireless LAN communicating sections 56/57); the number of connection stages from the root device 4-1 (the number of HOPs); activation/non-activation of the internal access point; and the number of low-level devices (the number of Childs) connected to the internal access point 4A.

Although each component device has an individual IP address, a multicast address is set as a multicast group in the audio system 10. When an IP packet of the above-described system information is transmitted to the multicast address, all component devices of the audio system 10 are enabled to receive the system information packet. The system information packet may be transmitted using unicast to the IP addresses of the component devices. When the system information packet is transmitted using multicast, however, the load of the network 9 can be reduced.

In the audio control table of FIG. 5, while associating with the device IDs of the devices, various sets of setting information such as: the IP address of the high-level side of each component device (the IP address of the wireless LAN communicating section 56); the device type; the installation place; the group; the service; the volume value; and the name to be displayed are stored. The columns of the audio control table and those of the system management table are associated with each other through the device IDs. Based on the contents of the audio control table, the controller 1 produces control screens (see FIGS. 8A to 9D) based on the contents of the audio control table, and accepts a control of each component device performed by the user. The installation place is information identifying the room where the audio device is disposed. Although the names of rooms are displayed in FIG. 5, room IDs may be stored as the information.

The service is information indicating an audio source(s) which can be reproduced by each audio device 4. The audio sources which can be reproduced by each of the audio devices 4 differ depending on the functions of the hardware and software of the audio device. According to FIG. 5, the audio device (root device) 4-1 having a device ID=00 can reproduce a DVD, Radio (including an FM broadcast and a net radio), and three kinds of music distribution services (net A, net B, and net C). The audio device 4-2 having a device ID=01 can reproduce a DVD and two kinds of music distribution services (net A and net B). The audio device 4-3 having a device ID=02 can reproduce Radio, Bluetooth, and Music distribution service net A. The audio device 4-4 having a device ID=03 can reproduce Radio and Bluetooth.

In order to enable the audio devices 4 to access the distribution server 6 for a music distribution service, an account is required. In each of the audio devices 4, therefore, a service account table 50A is disposed in the memory of the controlling section 50, and account information of accessible music distribution services is stored in the service account table 50A. FIG. 6 is a view showing an example of the service account table 50A of the audio device 4-1. In the service account table, columns are disposed for each accessible music distribution service. In the case of the audio device 4-1, the device can access the three music distribution services net A, net B, and net C, and therefore three columns are disposed corresponding to each of the services in the service account table 50A. In the column of each of music distribution services, a URL for accessing the distribution server 6 for the service, the account name, and a password are stored. The account name and the password are encrypted, and the information as it is cannot be transferred to the other audio devices 4. The fields of the account name and password of net A are blank because this music distribution service has not yet been accessed, and the account name and the password have not yet been registered. The registration of the account name and the password is performed through the mobile telephone 1 which is the controller 1.

Next, a procedure of reproducing a music piece of a music distribution service will be described with reference to flowcharts of FIGS. 7A and 7B, and examples of a control screen of FIGS. 8A to 9D.

FIG. 7A is a flowchart showing a procedure of registering the account of a music distribution service. When the audio system control program 45 is activated, the audio devices 4 of the audio system 10 on the network 9 are searched, and a room selection screen for selecting an audio device is displayed on the displaying section 41 (S1: FIG. 8A). The room selection screen is a screen for selecting a room (installation place) based on the audio control table of FIG. 5 and the system management table of FIG. 4, thereby selecting the audio device disposed in the room.

In the example of FIG. 8A, three room selection buttons 91 to 93 are displayed. The room selection button 91 is a button for selecting the living room, and the audio device 4-1 is selected by the button. The room selection button 92 is a button for selecting the kitchen, and the audio device 4-4 is selected by the button. The room selection button 93 is a button for selecting a bed room, and the audio device 4-3 is selected by the button. When the user operates (taps) one of the room selection buttons 91 to 93, the operation is detected by the touch panel 310, and the audio device 4 in the room is selected.

When the user taps one of the room selection buttons 91 to 93, and a room is selected (S2), the controller 1 causes a source selection screen for selecting a source which can be reproduced in the selected room (audio device) (S3: FIG. 8B). The example of FIG. 8B shows a source selection screen in the case where the living room is selected by tapping the room selection button 91. Source selection buttons 94 to 98 indicating sources which can be reproduced by the audio device 4-1 disposed in the living room are displayed on the source selection screen. The source selection button 94 is a button for selecting a DVD. The source selection button 95 is a button for selecting Radio. The source selection button 96 is a button for selecting Music distribution service net A. The source selection button 97 is a button for selecting Music distribution service net B. The source selection button 98 is a button for selecting Music distribution service net C.

When one of the source selection buttons 94 to 98 is tapped by the user (S4), the controlling section 20 determines whether the source can be reproduced or not, and, in the case where the account registration is necessary, whether the account has been already registered or not (S5). The account registration is not necessary with respect to a DVD and an FM radio (YES in S5), but is necessary with respect to a music distribution service and a part of Net radio. If the account of the selected source has been registered (YES in S5), the process proceeds to a process of reproducing the audio source (service). When contents are read from the audio source, and reproduction is started, a reproduction screen (Now Playing screen) such as shown in FIG. 8C is displayed on the displaying section 41.

If the account of the selected source has not yet been registered (NO in S5), the controlling section 20 advances the process to a process of registering the account of the audio source (service). In the case where Music distribution service net A is selected in the audio device 4-1, for example, the account of the music distribution service has not yet been registered as shown in FIG. 6, and therefore a process of registering the account is executed.

Hereinafter, the case where Music distribution service net A is selected in the audio device 4-1 will be described. When, by means of, for example, communication with the audio device 4-1, the controlling section 20 confirms that the account of Music distribution service net A has not yet been registered in the audio device 4-1, the controlling section causes an account registration screen shown in FIG. 8D to be displayed on the displaying section 41 (S6). Text information indicating that the account is not registered, an area 102 for inputting the account name (user name), and a password inputting area 103 are displayed on the account registration screen, and an input of account information by the user is accepted (S7). When the account information is input, the information is held in an account information buffer 23A (S8). Then, the controlling section 20 transmits the account information to the audio device 4-1 (S9), and waits until the audio device 4-1 accesses the distribution server 6 for Music distribution service net A by using the account information, and receives authentication (S10). During this, a spinning wait icon is displayed as shown in FIG. 8E to inform the user that the controlling section is in a waiting mode. If a reply indicating success of the authentication is sent from the audio device 4-1 (YES in S10), the account registration is completed.

As result of the above-described process, the registration of the account in the audio device 4-1 is completed, and the audio device 4-1 becomes to be able to reproduce music pieces of Music distribution service net A. However, the controlling section 20 does not cause the display image on the displaying section 41 to be transferred to the reproduction screen (Now Playing screen), and advances to an account copy operation (FIG. 7B) of, by using the account information remaining in the account information buffer 23A, registering the account information in an audio device (s) 4 which can access Music distribution service net A, but in which the account information has not yet been registered. In the case where the initial account registration fails (failure of the authentication by the distribution server 6 and the like), the controlling section does not advance to the account copy operation of FIG. 7B.

Figure 9D:
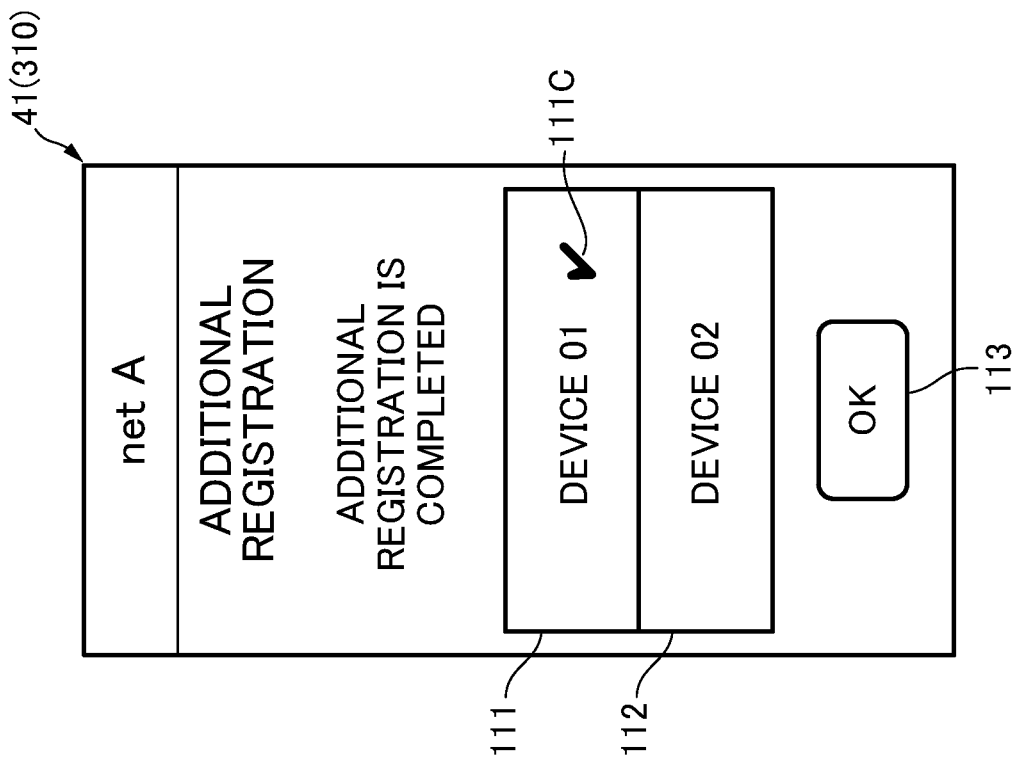

FIG. 7B is a flowchart showing an account copy process, and FIGS. 9A to 9D are views showing examples of the control screen during the account copy process. The controlling section 20 in which the account registration process of FIG. 7A has been completed advances to the process procedure of FIG. 7B, and, in the audio system 10, first searches a device(s) which can access the same distribution service as that registered in FIG. 7A, but in which the account has not yet been registered (hereinafter, such a device is sometimes referred to as "registration waiting device") (S21). The search may be performed by transmitting an inquiry message to the network 9 by using unicast or broadcast (multicast), and receiving a reply from each of the audio devices 4. When registration waiting devices are searched, an additional registration screen on which the names of the audio devices are listed is displayed (S22: FIG. 9A). On the additional registration screen of FIG. 9A, a heading indicative of the additional registration, sentences "Account-not-registered device is found. Additionally registered?" or the like are displayed, and device display columns 111, 112 in which the identification names of the found audio devices are displayed are displayed. The identification names of the found audio devices, and corresponding check boxes 111A, 111B for checking the selection state of each audio device are displayed in device display columns 111, 112. Here, the device IDs shown in the tables of FIGS. 4 and 5 are displayed as the identification names. However, the identification names are not limited to this. Any kind of name such as the product name of an audio device, and the room name can be used as far as the user can identify the audio device from the name.

Figure 9C:
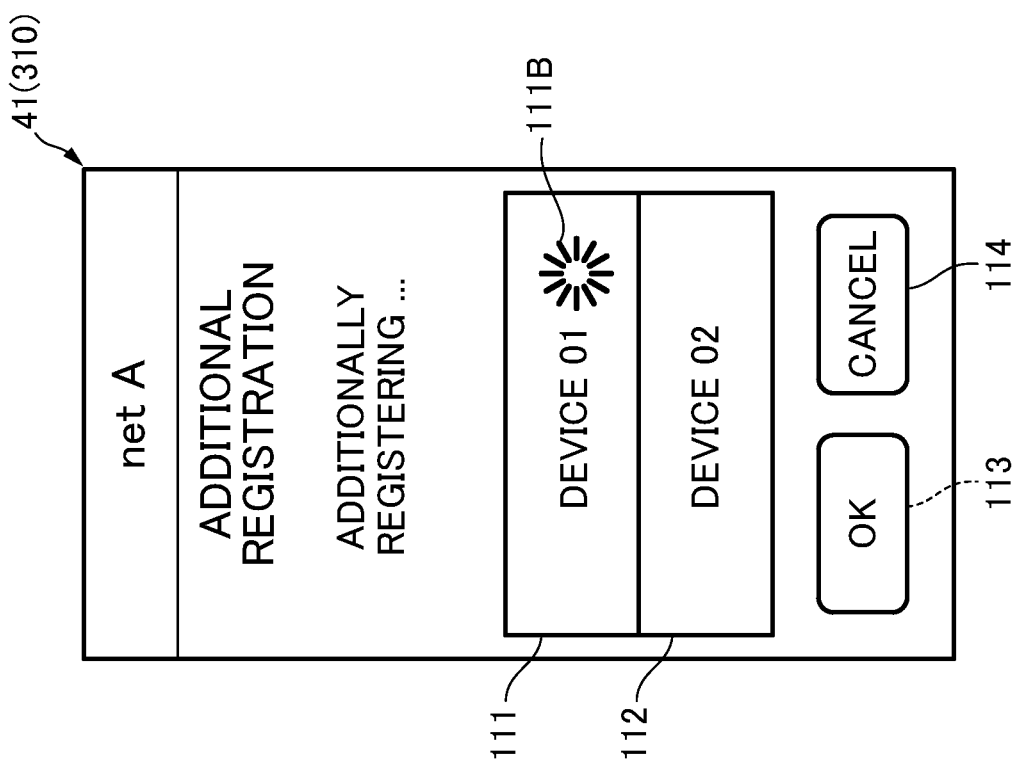

The user views the additional registration screen. If there is an audio device to be additionally registered, the user taps the column displaying the device to select the device (S23). FIG. 9B shows a state where Device 01 (the audio device 4-2) is selected. When the user taps an OK button 113 in this state, the account information stored in the account information buffer 23A is transmitted to the selected audio device 4, and the audio device 4 is caused to perform registration to the distribution server 6 (S24). The process waits in S25 until a result of the registration process is received from the audio device 4. In S25, a spinning wait icon 111B shown in FIG. 9C is displayed on the displaying section 41 to inform the user that the process is waiting. When a result indicating success of the registration (at this timing, the account information is updated and stored in the intra-memory service account table 50A of the controlling section 50 of the audio device 4) is received from the audio device in which the account is to be additionally registered, the result is displayed (S26: FIG. 9D), the contents of the account information buffer 23A are erased (S27), and the process proceeds to a screen for selecting contents of the music distribution service.

In FIGS. 9A to 9D, one audio device is selected. In the case where a plurality of audio devices are selected in S23, the spinning wait icon is displayed for each of the selected audio devices, a check mark 111C indicating that the registration succeeded, or a mark (a mark of × or the like) indicating that the registration failed is displayed for the audio devices in the order of earlier reception of the reply indicating the registration result.

Figure 10:
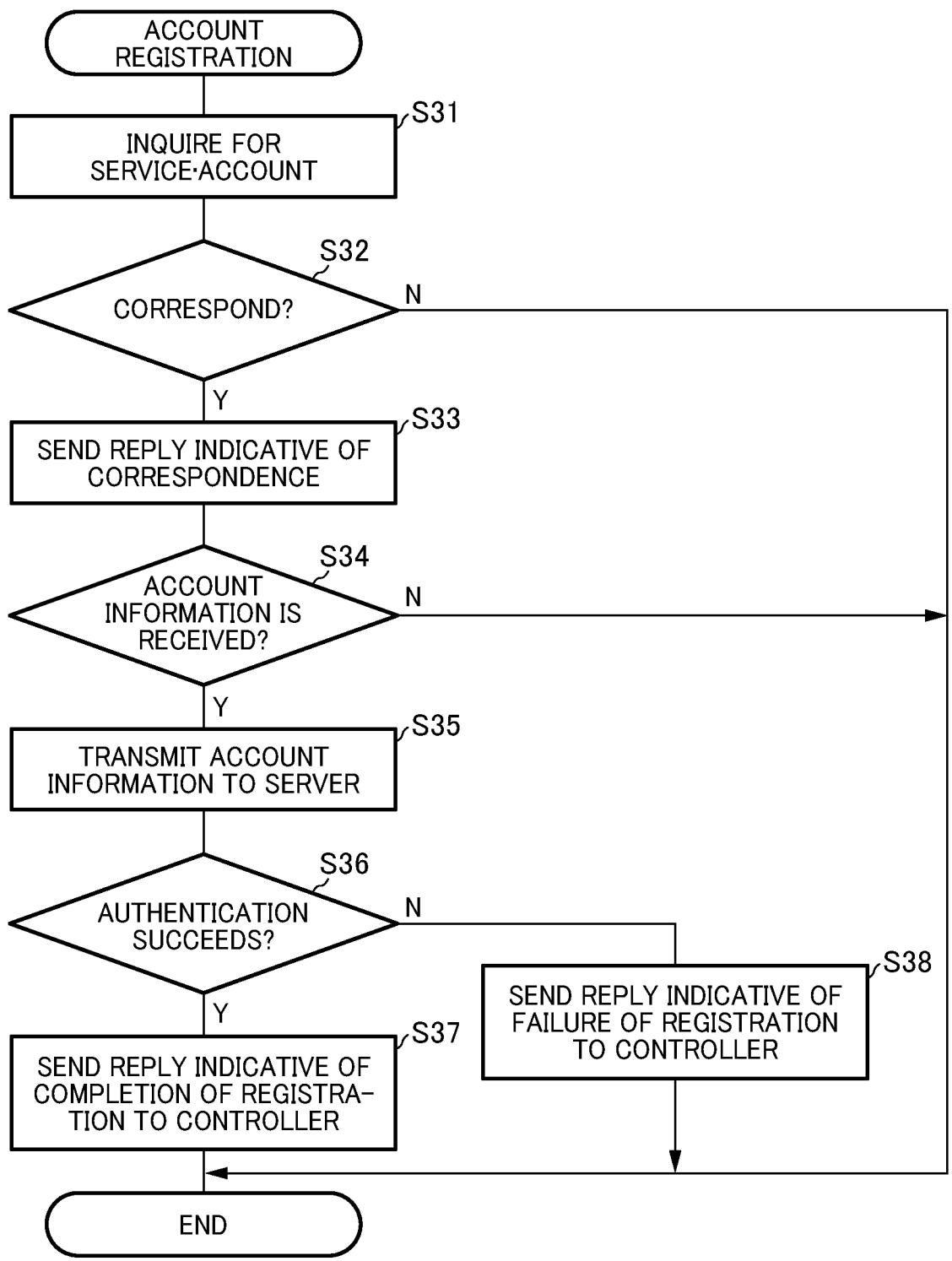
FIG. 10 is a flowchart showing the operation of a controlling section of the audio device.

Referring to the flowchart of FIG. 10, next, the operation of additionally registering the account of the audio device 4 will be described. When an inquiry is received from the controller 1 (S31), the controlling section 50 of the audio device 4 determines whether the device can access the music distribution service that is the target of the inquiry or not, and whether the account is unregistered or not, i.e., whether the device corresponds to the contents of the inquiry or not (S32). If the device does not correspond to the contents of the inquiry (NO in S32), the operation is ended without performing a further operation.

If the device corresponds to the contents of the inquiry (YES in S32), a reply indicative of this is transmitted to the controller 1 (S33). Thereafter, the controlling section waits in S34 until the account information is received. If, even after waiting for a predetermined period of time, the account information is not transmitted (NO in S34), the controlling section determines that the device is not selected by the user as the target of additional registration, and the operation is ended without performing a further operation.

If the account information is transmitted from the controller 1 (YES in S34), the account information is transmitted to the distribution server 6 for the music distribution service, and authentication is tried (S35). If a reply indicating success of the authentication is received from the distribution server 6 (YES in S36), a reply indicating completion of the registration is transmitted to the controller 1, updating and storing operations are performed on the service account table 50A based on the account information (S37), and the operation is ended. If a reply indicating failure of the authentication is received from the distribution server 6 (NO in S36), by contrast, a reply indicating failure of the registration is transmitted to the controller 1 (S38), and the operation is ended.

Figure 11:
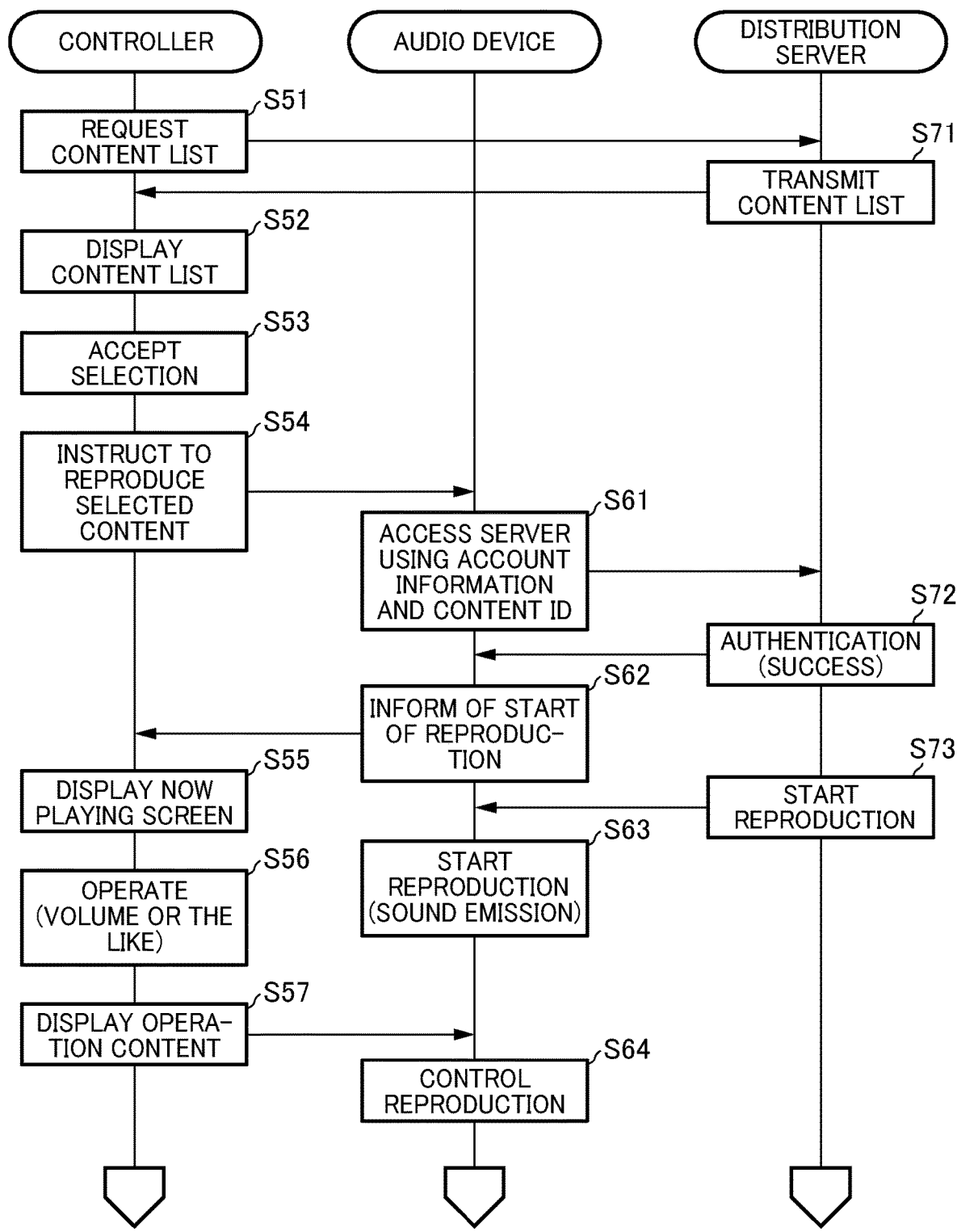
FIG. 11 is a view showing the procedure of reproducing a music piece which uses a music distribution service, and which is performed by the controller and the audio device.

FIG. 11 is a view showing the procedure of reproducing a music piece which uses a music distribution service, and which is performed by the controller 1 and the audio device 4. The procedure is executed in the case where the account has been registered in S5 of FIG. 7A, and also after completion of the process of S27 of FIG. 7B. First, the controller 1 requests a content list in which reproduceable contents are listed, to the distribution server 6 (S51). The distribution server 6 transmits as a replay a content list to the controller 1 in response to the request (S71). The controller 1 causes the displaying section 41 to display the received content list (S52), and accepts selection by the user (S53). When a content is selected, the controller 1 instructs a predetermined (designated as a reproduction device) audio device 4 to reproduce the selected content (S54).

The audio device 4 which is instructed to perform reproduction accesses the distribution server 6 by using the account information stored in the service account table 50A, and the content ID of the selected content (S61). If the access is valid (success of authentication), the distribution server 6 transmits information indicating this as a reply to the audio device 4 (S72), and begins reproduction•transmission of the selected content (S73). Alternatively, the audio device 4 may previously complete authentication in the distribution server 6, and be set to a login state before the start of the operation of FIG. 11, and, in S61, transmit only the content ID.

When the audio device 4 receives the reply indicating success of the authentication from the distribution server 6, the audio device informs the controller 1 of start of reproduction (S62). In response to this, the controller 1 causes a reproduction screen (Now Playing screen) such as shown in FIG. 8C to be displayed (S55). When a reproduced content (audio signal) is transmitted from the distribution server 6, the audio device 4 receives it, and starts sound emission (S63).

As shown in FIG. 8C, various operation elements such as the sound volume and reproduction stop/pause are displayed on the Now Playing screen, and the user can control the reproduction by applying a tapping operation or a sliding operation to the operation elements. When any kind of operation is performed by the user (S56), the controller 1 edits the contents of the operation into a command, and transmits the command to the audio device 4 (S57). When the audio device 4 receives the command from the controller 1, the audio device controls the reproduced content in accordance with the command (S64).

In the flowchart of the account copy (additional registration) of FIG. 7B, and the examples of the control screen of FIG. 9, registration waiting devices are displayed in a list in S22, and the user is caused to select a device in which account information is to be additionally registered. Alternatively, the user may not be requested to perform the selection, and account information may be registered in all of found registration waiting devices.

Furthermore, account information is updated and stored in the intra-memory service account table 50A of the controlling section 50 of the audio device 4, and then the contents of the account information buffer 23A of the controller 1 are erased. In the audio device 4, until the contents of the account information buffer 23A are erased, alternatively, account information may be temporarily stored in another place, and, on the condition that the contents of the account information buffer 23A are erased, the account information may be updated and stored in the intra-memory service account table 50A of the controlling section 50.

In the case where a plurality of accounts can be registered in a music distribution service, even when an account has been already registered, a registration waiting device may be added in the list which is displayed in S22, when there is an extra number of accounts, and the account to be registered at this time has not been registered. In this case, among the registration waiting devices displayed in the list, an audio device in which an account is to be registered at a first time may be displayed by default in the selected state, and audio devices in which an account is to be registered at second and subsequent times may be displayed by default in the selection cancelled state. With respect to an audio device in which an account is to be first registered, moreover, it may be configured so that the selected state cannot be cancelled.

Although, in the embodiment, an account of a music distribution service has been exemplarily described, an account to be registered is not limited to this. For example, the account may be an account of a motion picture distribution service, that of an internet radio, or the like.

In the above-described embodiment, the audio device 4 reads contents from an audio source, and reproduces the contents. Namely, it is described that contents to be reproduced are audio data. However, the contents are not limited to audio data such as a music piece or sound of a radio, but may be video data such as a motion picture or a television picture, or image data such as a photograph or a still picture. Namely, the audio device 4 in the invention may be an audio•visual device (AV device) which can reproduce both video data and image data, and the audio system 10 may be a system in which both an audio device and an AV device exist. Although, in the embodiment, the control terminal device is realized by the mobile telephone (controller) 1 in which the audio system control program 70 (application program) is installed, a configuration other than this may be employed. For example, a tablet in which the audio system control program 70 is installed may be used, or a dedicated terminal device may be used.

According the invention, in a control terminal which controls a plurality of devices, it is possible to facilitate registration of account information for the plurality of devices.

What is claimed is:

1. A device control method for controlling a plurality of devices, comprising:
   registering an account information in a first device which is one of the plurality of devices, wherein the account information is stored in a buffer of a control section of a control terminal device;
   after registration of the account information in the first device, searching by the control terminal device at least one second device, the second device being at least one device of the plurality of devices and being a device in which the account information is not registered;
   transmitting, by the control terminal device, the account information stored in the buffer to the at least one searched second device;
   registering the account information in the at least one searched second device by using the account information transmitted from the control terminal device;
   displaying information for accepting an input of the account information on a displaying section of the control terminal device and accepting, by the control section of the control terminal device, the input of the account information by a user when the control section confirms that the account information has not yet been registered in the first device; and
   registering the account information in the buffer of the control section of the control terminal device.

2. The device control method according to claim 1, wherein the account information is account information for accessing a server on a network; and
   wherein a device which is accessible to the server and in which the account information is not registered is searched as the second device.

3. The device control method according to claim 2, wherein the plurality of devices are audio devices configured to receive an audio signal and emit sound based on the audio signal; and
   wherein the server is a music distribution server which supplies the audio signal to the audio devices.

4. The device control method according to claim 1, wherein the at least one searched second device is displayed on a displaying section; and
   wherein the account information is registered in a device which is selected by an operation from the at least one searched second device that is displayed on the displaying section.

5. The device control method according to claim 1, wherein a device, in which a plurality of sets of account information are registerable and in which the account information that is registered in the first device is not registered, and in which other account information is registered, is searched as the second device.

6. A control terminal device for controlling a plurality of devices, comprising:

a user interface configured to receive an input of account information;
a buffer disposed in a control section of the control terminal device and configured to temporarily store the input account information;
a processor; and
a memory having stored thereon instructions executable by the processor to cause the control terminal device to perform:
temporarily storing the account information which is input through the user interface;
reading the account information from the buffer, and registering the read account information in a first device which is one of the plurality of devices;
after registration of the account information in the first device, searching a second device in which the account information is not registered, the second device being one of the plurality of devices; and
transmitting the account information stored in the buffer to the at least one searched second device;
reading the account information from the buffer, and registering the read account information in the searched second device by using the account information transmitted from the control terminal device; and
after registration of the account information in the second device, erasing the account information from the buffer;
displaying information for accepting an input of the account information on a displaying section of the control terminal device and accepting, by the control section of the control terminal device, the input of the account information by a user when the control section confirms that the account information has not yet been registered in the first device; and
registering the account information in the buffer of the control section of the control terminal device.

7. A device control system comprising:
a plurality of devices; and
a control terminal device configured to communicate with the plurality of devices through a network, and comprising:
  a processor configured to:
    register an account information in a first device which is one of the plurality of devices;
    after registration of the account information in the first device, search at least one second device, the second device being at least one device of the plurality of devices and being a device in which the account information is not registered; and
    register the account information in the at least one searched second device; and
  a buffer disposed in a control section of the control terminal device and configured to store the account information;
wherein the control terminal device transmits the account information stored in the buffer to the at least one searched second device;
wherein the processor registers the account information in the at least one searched second device by using the account information transmitted from the control terminal device;
wherein a displaying section of the control terminal device displays information for accepting an input of the account information;
wherein the processor accepts the input of the account information by a user when the control section confirms that the account information has not yet been registered in the first device; and
wherein the processor registers the account information in the buffer of the control section of the control terminal device.

8. The device control system according to claim 7, wherein the account information is account information for accessing a server on the network; and
  wherein a device which is accessible to the server and in which the account information is not registered is searched as the second device.

9. The device control system according to claim 8, wherein the plurality of devices are audio devices configured to receive an audio signal and emit sound based on the audio signal; and
  wherein the server is a music distribution server which supplies the audio signal to the audio devices.

10. The device control system according to claim 7, wherein the at least one searched second device is displayed on a displaying section; and
  wherein the account information is registered in a device which is selected by an operation from the at least one searched second device that is displayed on the displaying section.

11. The device control system according to claim 7, wherein a device, in which a plurality of sets of account information are registerable and in which the account information that is registered in the first device is not registered, and in which other account information is registered, is searched as the second device.

* * * * *